United States Patent [19]
Hutchings et al.

[11] Patent Number: 5,976,197
[45] Date of Patent: *Nov. 2, 1999

[54] DYEING PROCESS AND DYES

[75] Inventors: Michael Gordon Hutchings, Bury, United Kingdom; Colin Michael Brennan, Worms, Germany; Neil Anthony Tallant; Andrew Paul Shawcross, both of Manchester, United Kingdom; Prakash Patel, Huddersfield, United Kingdom; Warren James Ebenezer, Stockport, United Kingdom

[73] Assignee: Zeneca Limited, London, United Kingdom

[*] Notice: This patent is subject to a terminal disclaimer.

[21] Appl. No.: 08/952,170

[22] PCT Filed: Apr. 9, 1996

[86] PCT No.: PCT/GB96/00867

§ 371 Date: Jan. 30, 1998

§ 102(e) Date: Jan. 30, 1998

[87] PCT Pub. No.: WO96/35012

PCT Pub. Date: Nov. 7, 1996

[30] Foreign Application Priority Data

May 6, 1995 [GB] United Kingdom .................. 9509295

[51] Int. Cl.$^6$ ............. D06P 1/382; D06P 1/384; C09B 62/008; C09B 62/651
[52] U.S. Cl. .......... 8/543; 8/549; 8/602; 8/604; 534/631; 534/634; 534/641
[58] Field of Search .............. 8/543–549, 602, 8/604; 534/631–641

[56] References Cited

U.S. PATENT DOCUMENTS

| | | |
|---|---|---|
| 3,197,269 | 7/1965 | Drake et al. . |
| 4,278,436 | 7/1981 | Marschner et al. . |
| 4,701,182 | 10/1987 | von der Eltz et al. . |
| 4,718,918 | 1/1988 | Heller et al. . |
| 4,752,299 | 6/1988 | Annen et al. . |
| 5,755,862 | 5/1998 | Gregory et al. ............ 106/31.48 |
| 5,772,699 | 6/1998 | Boyer . |

FOREIGN PATENT DOCUMENTS

| | | |
|---|---|---|
| 133 270 | 2/1985 | European Pat. Off. . |
| 489 692 | 6/1992 | European Pat. Off. . |
| 568 860 | 11/1993 | European Pat. Off. . |
| 1 315 333 | 1/1963 | France . |
| 1 454 196 | 9/1966 | France . |
| 1 525 597 | 5/1968 | France . |
| 2 084 024 | 12/1971 | France . |
| 2 092 056 | 1/1972 | France . |
| 2 208 025 | 6/1974 | France . |
| 1 104 918 | 3/1968 | United Kingdom . |
| 1 122 276 | 8/1968 | United Kingdom . |
| 2 008 145 | 5/1979 | United Kingdom . |
| 95 25842 | 9/1995 | WIPO . |

Primary Examiner—Margaret Einsmann
Attorney, Agent, or Firm—Pillsbury Madison & Sutro, LLP

[57] ABSTRACT

A process for defining a substrate is provided. The process comprises applying to the substrate a water soluble dye having at least two electrophilic groups and a nucleophilic agent having a molecular weight below 600 and at least one group selected from aliphatic primary amino groups and secondary amino groups.

10 Claims, No Drawings

DYEING PROCESS AND DYES

This invention relates to a process for dyeing substrates, to dyes and to compositions.

In conventional dyeing processes using water-soluble dyes, not all dye fixes to a substrate and, after dyeing, the dyehouse has the expensive problem of disposing of highly coloured solutions containing unfixed dye. For example, during normal exhaust dyeing some unfixed dye remains in the dyebath, whilst some only loosely adheres to textiles and has to be washed-off in the dyehouse to avoid later cross-staining of adjacent fibres during domestic washing. This can result in large volumes of coloured effluent which often contains considerable amounts of dissolved dye. There is a need for a dyeing process which results in colourless or weakly coloured effluent and, ideally, coloured textiles which require less or no washing after dyeing is complete. Such a process would make dyehouses more environmentally friendly and reduce their effluent disposal costs.

According to a first aspect of the present invention there is provided a process for the coloration of a substrate comprising applying thereto a water-soluble dye having at least two electrophilic groups and a nucleophilic agent having a molecular weight below 600 and at least one group selected from aliphatic primary amino groups and aliphatic secondary amino groups.

The dye and the nucleophilic agent may react together during the process to form a highly substantive species which has great affinity for the substrate. The precise mechanism is not fully understood, but the species might exist as some form of oligomer or polymer wherein the agent and dye are joined together by either covalent bonds formed between the electrophilic groups of the dye and aliphatic primary/secondary group(s) in the nucleophilic agent, or by anion-cation attraction between anionic groups in the dye (when present) and cationic protonated aliphatic primary and secondary amino groups. Possibly both of these mechanisms play a part in formation of the highly substantive species.

It is possible to select appropriate combinations of dyes and nucleophilic agents for use in the process by measuring how much dye is immobilised under exhaust dyeing conditions. Very high immobilisation under these conditions indicates that the dye and nucleophilic agent form the highly substantive species and this behaviour is reflected in other dyeing processes, e.g. printing, continuous and semi-continuous dyeing.

Preferably the dye and the nucleophilic agent used in the process are such that if they are applied to cotton by exhaust dyeing at least 90%, more preferably at least 95%, especially at least 97%, more especially from 99% to 100% of the dye is immobilised. This definition is not intended to limit processes of the invention to exhaust dyeing, but serves as a useful test for identifying combinations of dyes and nucleophilic agents which can react together and form a highly substantive species under a whole variety of different dyeing conditions.

The extent of immobilisation of the dye may be determined by dissolving 0.100 grammes ("W1") of dye in a dyebath containing 30 ml of water buffered at pH 7, adding 0.75 g of sodium sulphate and 5 g of cotton, heating to 95° C. over one hour, maintaining the temperature at 95° C. for one hour, then adding nucleophilic agent such that the ratio of electrophilic groups in the dye to the total amount of aliphatic primary amino groups and aliphatic secondary amino groups in the nucleophilic agent is 2:3, heating for one further hour at 95° C., followed by removing the dyed cotton from the dyebath and stirring the dyed cotton for 15 minutes with each of (i) 50 ml of water containing 0.03 grammes of acetic acid, and (ii) three lots of 50 ml of boiling water, wherein the total weight in grammes of dye dissolved in the dyebath and washes is determined using a spectrophotometer ("W2") and the % immobilisation is given by the calculation:

$$[(W1-W2) \div W1] \times 100\%$$

When some combinations of dye and agent are heated under exhaust dyeing conditions in the presence of a substrate they form not only a highly substantive species on the substrate but also a solid precipitate which can fall to the bottom of the dyebath. Under these circumstances the % immobilisation is still calculated as described above because the precipitate is not actually dissolved in the dyebath. The presence of a precipitate in the dyebath is usually acceptable because it can easily be removed by filtration, thereby lowering the chemical content of dye liquors which are disposed of after dyeing. However, to avoid wasting dye it is preferred that the amount of precipitate formed in the dyebath is less than 10%, more preferably less than 5%, especially less than 2%, more preferably 0% by weight relative to the weight of dye used.

A valuable feature of the present coloration process is that the dye and nucleophilic agent may be joined together without the need for free radical initiators. The process can operate using aqueous solutions of the dye and nucleophilic agent at practical temperatures using normal dyeing equipment. In one embodiment the molecular weight of the nucleophilic agent is below 600 and at least 50 below that of the dye.

As will be understood, the electrophilic groups in the water-soluble dye are required to react with aliphatic primary and/or secondary amino groups in the nucleophilic agent (this allows formation of a highly substantive species). Thus where the water-soluble dye is a reactive dye the process for coloration is performed under conditions such that the dye does not react to a significant extent with the substrate (e.g. <10% reacts, preferably <5%) before it reacts with the nucleophilic agent. Hence the present process is distinct from a simple post-dyeing after treatment involving contacting a substrate dyed with a reactive dye (wherein dye has lost its reactive groups) with a nucleophilic agent. Conditions where the dye does not react to a significant extent with the substrate before it can react with the nucleophilic agent can be selected by dyers without difficulty, for example high pH and high temperatures tend to encourage covalent bond formation between reactive dyes and cellulosic substrates and would therefore be avoided.

The Dye

Preferably the dye has from 2, 3, 4, 5, or 6 electrophilic groups. The electrophilic groups may be any group capable of forming a covalent bond with the nucleophilic agent during the coloration process. Preferably said electrophilic group is a group capable of undergoing 1) a substitution reaction, 2) an addition reaction or 3) an elimination and addition reaction with the aforementioned nucleophilic agent.

Preferred groups capable of undergoing a substitution reaction are of the formula $-COCH_2-X^1$, $-COCHR^1CH_2-X^1$, $-COCHX^1CHX^1CO_2R^2$, $-COCHX^1CHX^1COR^1$, $-CH_2-X^1$ and $-NHCOCH_2-X^1$ wherein:

$X^1$ is a labile group;

$R^1$ is H or a labile group;

$R^2$ is H or optionally substituted alkyl, aryl or heteroaryl; and $X^1$ is preferably halo, especially chloro, bromo or iodo.

A labile group is a group displaceable by the aliphatic primary or secondary amino group in the aforementioned nucleophilic agent when the dye is heated or basified.

When $R^1$ is a labile group it is preferably halo, especially chloro.

The optional substituents which may be present on $R^2$ are preferably as mentioned hereinafter for $L^2$. $R^2$ is preferably H, phenyl or $C_{1-4}$-alkyl, especially methyl or ethyl.

A further group capable of undergoing a substitution reaction is a labile group attached to a heterocycle, for example a triazine ring. The labile group is preferably chloro or fluoro, or a quaternary ammonium group such as optionally substituted pyridinium.

Groups which are capable of undergoing an addition reaction preferably comprise an epoxide group, an aziridine, aziridinium, azetidine or cyclopropane group or, more preferably, an activated alkene (e.g. alkenyl sulphone) or alkyne capable of undergoing a Michael-type addition with the aforementioned nucleophilic group.

A preferred activated alkene is or comprises a group of formula —$Z^1$—$CR^3$=$CR^4R^5$, —$CR^3$=$CR^5$—$Z^2$ or —$CZ^2$=$CR^3R^5$ wherein $Z^1$ and $Z^2$ are electron withdrawing groups and $R^3$, $R^4$ and $R^5$ are each independently H, $C_{1-4}$-alkyl or halo. $Z^1$ is preferably —SO—, —$SO_2$—, —CO—, especially —$SO_2$—, and $Z^2$ is preferably —CN, —$NO_2$ or an alkyl- or arylsulphonyl group or an acyl group. The activated alkene of formula —$Z^1$—$CR^3$=$CR^4R^5$ may be attached to a group of formula —$NR^2$— (wherein $R^2$ is as hereinbefore defined) to give a group of formula —$NR^2$—SO—$CR^3$=$CR^4R^5$, —$NR^2$—$SO_2$—$CR^3$=$CR^4R^5$ or —$NR^2$—CO—$CR^3$=$CR^4R^5$. Preferred alkylsulphonyl groups are —$SO_2$—($C_{1-4}$-alkyl) and preferred arylsulphonyl groups are phenylsulphonyl and tosyl. Preferred acyl groups are of the formula —CO—$R^2$ wherein $R^2$ is as hereinbefore defined, especially $C_{1-4}$-alkyl or phenyl. It is preferred that $R^3$ and $R^4$ are both H.

Examples of activated alkenes include the following:

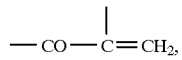

—NHCOCBr=$CH_2$, —CO—CBr=CHBr,

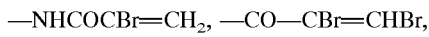

—$SO_2$—CH=$CH_2$,    —SO—CH=$CH_2$,
—COCCl=$CCl_2$, —$SO_2$CH=CHCl, —CH=CH—CN,
—CH=CH—$NO_2$, —C(CN)=$CH_2$, —$NHSO_2$—CH=$CH_2$, —N($CH_3$)$SO_2$CH=$CH_2$, —C($NO_2$)=$CH_2$ and

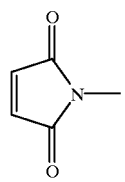

A preferred group capable of undergoing an elimination and addition reaction is or comprises a group of the formula —$Z^1$—$NR^2$—($CR^6R^6$)$_m$—$X^2$ or —$Z^1$($CR^6R^6$)$_m$—$X^2$, especially —$Z^1$—NH—$CH_2$—$CH_2$—$X^2$ and —$Z^1$—$CH_2$—$CH_2$—$X^2$ wherein $X^2$ is a labile group; $Z^1$ and $R^2$ are as hereinbefore defined; each $R^6$ independently is halo, —$NH_2$, carboxy or a group described above for $R^2$; and m is 2, 3 or 4. Preferably the labile group represented by $X^2$ is —$OSO_3H$, —$SSO_3H$, —$OPO_3H_2$, or a salt thereof, halo (especially chloro) or acetoxy. The groups of formula —$Z^1$($CR^6R^6$)$_m$—$X^2$ may be attached to a group of formula —$NR^2$— as defined above, in which case the $CR^6R^6$ groups may be replaced by $CHR^6$ groups.

Examples of groups capable of undergoing an elimination and addition reaction include the following:
—$SO_2CH_2CH_2OSO_3H$, —$SO_2(CH_2)_3OSO_3H$,
—$SO_2CH_2CH_2Cl$, —$SO_2CH_2CH_2OPO_3H_2$,
—$NHCOCH_2CH_2OSO_3H$, —$SO_2CH_2CH_2OCOCH_3$,
—$SOCH_2CH_2OSO_3H$, —$SO_2CH_2CH_2SSO_3H$,
—$NHSO_2CH_2CH_2OSO_3H$, —$NHSO_2(CH_2)_3SSO_3H$,
—$NHSO_2(CH_2)_4OSO_3H$, —$N(CH_3)SO_2CH_2CH_2OSO_3H$, —$SO_2NH$—CH($CH_3$)$CH_2$—$OSO_3H$, —$SO_2NH$—CH($CH_2CH_3$)$CH_2$—$OSO_3H$, —$SO_2NH$—C(OH)($CH_3$)$CH_2$—$OSO_3H$, —$SO_2NH$—CH($CH_3$)CH(Ph)—$OSO_3H$, —$SO_2NHCH(OSO_3H)$$CH_2$—$OSO_3H$, —$SO_2NHCH(COOH)CH_2OSO_3H$, —$SO_2NHCH(Ph)CH_2OSO_3H$, —$SO_2NHCH_2CH_2Cl$, —$SO_2NHC(CH_3)_2CH_2OSO_3H$, —$SO_2NHC(CH_2OSO_3H)_3$, —$SO_2NHCH_2CH_2Br$, —$SO_2NHCH_2CH_2OSO_3H$, —$SO_2NHC(CH_3)(OH)CH_2OSO_3H$ and —$SO_2NH(CH_2)_3$—$OSO_3H$.

In one embodiment the aforementioned groups of formula —$Z^1$—$NR^2$—($CR^6R^6$)$_m$—$X^2$, —$NR^2$—$Z^1$($CR^6R^6$)$_m$—$X^2$, —$Z^1$—$CR^3$=$CR^4R^5$, —$CR^3$=$CR^5$—$Z^2$ and —$CZ^2$=$CR^3R^5$ are attached directly to an aromatic carbon atom, for example the carbon atom of an aromatic ring such as a benzene ring, in molecules of the dye.

Particularly good results are found where the electrophilic group is an activated alkene or a group capable of undergoing an elimination and addition reaction, especially vinyl sulphones and groups which are convertible to vinyl sulphones on treatment with aqueous alkali.

Preferably the dye is capable of absorbing radiation at a wavelength in the region from the ultraviolet to the infra-red, preferably in the visible region of the spectrum, especially light of a wavelength from 400 to 700 nm. Preferably the dye has an extinction coefficient of at least 5,000, more preferably at least 10,000, especially from 10,000 to 300,000, more especially from 10,000 to 150,000.

The dye can contain any chromophore. The dye is preferably an azo, anthraquinone, phthalocyanine, triphenodioxazine, triphenylmethane, formazan, xanthene or benzdifuranone dye or a dye which contains a combination of these chromophores, especially an azo dye.

Preferred azo dyes contain 1,2,3 or 4 azo (—N=N—) groups. Preferably the dye has high substantivity as this greatly enhances immobilisation of the dye when it reacts with the nucleophilic agent.

According to a preferred embodiment of the present invention the dye has the Formula (1) or is a salt thereof:

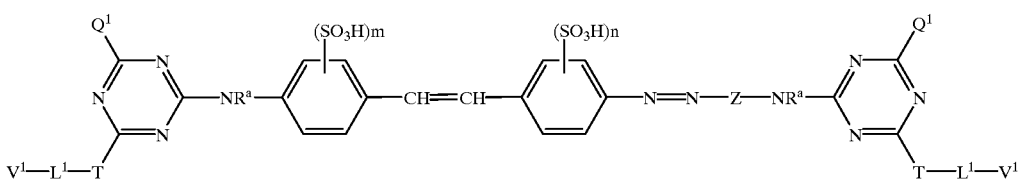

(1)

wherein:

each $Q^1$ independently is a labile or non-labile substituent;

each T independently is —O—, —S— or —$NR^a$—;

each $L^1$ independently is a divalent organic linker group;

each $V^1$ independently is a group which is capable of undergoing an addition reaction or an elimination and addition reaction;

each $R^a$ independently is H or optionally substituted alkyl;

Z is the residue of a coupling component; and m and n are each independently 0 or 1.

By "labile substituent" it is meant an atom or group attached directly to the triazine ring which is displaceable by the hydroxy group of a cellulosic material under alkaline conditions. The preferred labile atom is a halogen, especially Cl or F. The preferred labile group is sulpho, more preferably a quaternary ammonium group. As examples of quaternary ammonium groups there may be mentioned trialkyl ammonium groups and optionally substituted pyridinium groups, especially 3-carboxypyridinium and 4-carboxypyridinium.

Non-labile substituents represented by each $Q^1$ include groups of formula —$NR^7R^8$ and —$OR^7$ wherein $R^8$ is H or alkyl and $R^7$ is H, optionally substituted alkyl or optionally substituted aryl. Preferably $R^8$ is H or optionally substituted $C_{1-4}$-alkyl and $R^7$ is H, optionally substituted $C_{1-4}$ alkyl or optionally substituted phenyl.

Preferably each T independently is —$NR^a$— wherein $R^a$ is as hereinbefore defined.

The divalent organic linker group represented by each $L^1$ is preferably an optionally substituted or interrupted alkylene group containing from 2 to 10 carbon atoms, especially $C_{2-4}$-alkylene, or more preferably an optionally substituted $C_{6-11}$arylene group, more preferably optionally substituted phenylene or naphthylene.

Preferred groups represented by $V^1$ which are capable of undergoing an addition reaction or an elimination and addition reaction are as described in International Patent Application No. PCT/GB93/02344, page 6, line 13 to page 8, line 18, which is included herein by reference thereto. Preferably each $V^1$ independently is a vinyl sulphone group or a group which is convertible to a vinyl sulphone group on treatment with an aqueous alkali, or a group of formula —$SO_2NHCH_2CH_2$—Y wherein Y is —$OSO_3H$, —$SSO_3H$, —Cl or —$OCOCH_3$.

Each $R^a$ is preferably H or $C_{1-4}$-alkyl, especially H, methyl or ethyl.

The residue of a coupling component represented by Z is preferably an optionally substituted buta-1,3-dione, phenylene, naphthylene or heterocyclic group (e.g. a pyrazolone), more preferably Z is optionally substituted 1,3- or 1,4-phenylene.

When $L^1$, Z, $R^a$, $R^7$ or $R^8$ is substituted it is preferred that each substituent is selected from amino, alkyl (preferably $C_{1-4}$-alkyl) alkoxy (preferably $C_{1-4}$-alkoxy), amido (preferably —$NHCOC_{1-4}$-alkyl), cyano, ureido, sulpho, carboxy, hydroxy, nitro and halo.

Preferably m and n have a value of 1. When m and n are 1 it is preferred that the sulpho groups shown in formula (1) (and for that matter in Formula (2) below) are both ortho with respect to the —CH=CH— group.

A preferred dye of Formula (1) is of Formula (2) and salts thereof:

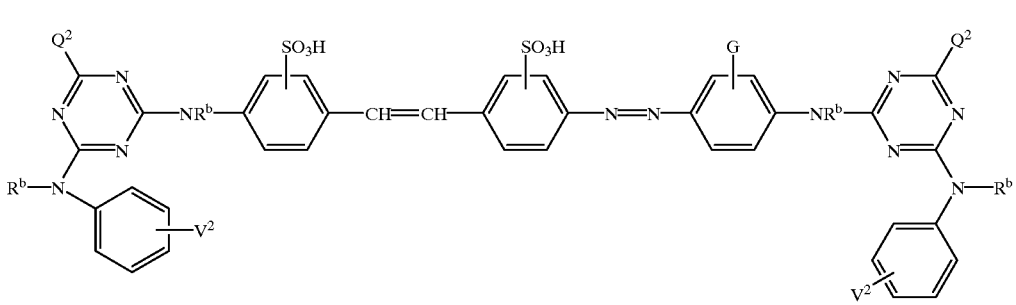

(2)

wherein:

each $R^b$ independently is H or $C_{1-4}$-alkyl;

G is H, alkyl, alkoxy, amido, ureido, halo, nitro, carboxy, amino or sulpho;

each $Q^2$ independently is F, Cl or a quaternary ammonium group; and each $V^2$ independently is a vinyl sulphone group or a group which is convertible to a vinyl sulphone group on treatment with aqueous alkali, or a group of formula —O$_2$NHCH$_2$CH$_2$— wherein Y is —OSO$_3$H, —SSO$_3$H, —Cl or —OCOCH$_3$, or a group of formula:

—NHCOCR$^b$=CH$_2$ or —NHCOCBr=CH$_2$.

G is preferably H, C$_{1-4}$-alkyl, C$_{1-4}$-alkoxy, —NHCOC$_{1-4}$-alkyl or ureido, more preferably H, methyl, methoxy, ureido or —NHCOCH$_3$.

The V$^2$ groups shown in Formula (2) are preferably at the 3- or 4-position relative to the —NR$^b$— group.

Groups which are convertible to a vinyl sulphone group (i.e. —SO$_2$CH=CH$_2$) on treatment with aqueous alkali include —SO$_2$CH$_2$CH$_2$OSO$_3$H, —SO$_2$CH$_2$CH$_2$SSO$_3$H, —SO$_2$CH$_2$CH$_2$OCOCH$_3$ and —SO$_2$CH$_2$CH$_2$Cl.

The dyes of Formula (1) can be applied to substrates in conjunction with a nucleophilic agent to give high levels of colour and good fastness to water.

The dyes of Formula (1) may be prepared by condensing a compound of Formula (7) with about two molar equivalents of a compound:

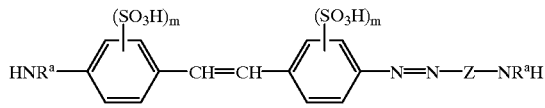

(7)

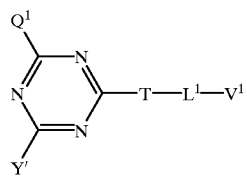

(8)

of Formula (8) wherein Z, R$^a$, T, V$^1$, L$^1$, X$^a$, Q$^1$, m and n are as hereinbefore defined and Y' is a labile group (preferably Cl or F).

In the above process it is preferred to use about two molar equivalents of the compound of Formula (8) relative to the compound of Formula (7) because using more or less is wasteful of whichever compound is in excess. Normally, therefore, one will use from 1.5 to 2.5, preferably from 1.8, particularly from 2.0, to 2.2, molar equivalents of the compound of Formula (8). The condensation is preferably performed in an aqueous solvent, especially water. A temperature of 20 to 40° C. is preferred, and a reaction time of 2 to 48 hours is convenient.

The compound of Formula (7) may be prepared by diazotising a suitable 4amino-4'-nitro-stilbene derivative, coupling onto a coupling component (e.g. an aniline compound) and reducing the nitro group. The compound of Formula (8) can be prepared by condensing an appropriate triazine compound with a compound of Formula H—T—L$^1$—V wherein T,L$^1$ and V are as hereinbefore defined.

The Nucleophilic Agent

In the first aspect of the invention, the nucleophilic agent has a molecular weight below 600 and at least one group selected from aliphatic primary amino groups and aliphatic secondary amino groups. In one embodiment of the first aspect, the nucleophilic agent has a molecular weight in the range 60 to 599, more preferably 100 to 550.

Preferably the nucleophilic agent of the first aspect has at least two aliphatic primary or secondary amino groups because this is believed to give a highly substantive polymer in which the dye and agent constitute alternative units. However in some cases, depending on the dye and agent, reaction of the two or more electrophilic groups in the dye with nucleophilic agents having only one aliphatic primary or secondary amino group can produce a highly substantive species.

The aliphatic primary amino group is an amino of group formula —NH$_2$ attached to a nitrogen atom or an aliphatic carbon atom and an aliphatic secondary amino group is a group of formula —NH— attached to two aliphatic carbon atoms or to one aliphatic carbon atom and one nitrogen atom.

It is believed important that the —NH$_2$ and —NH— groups in aliphatic primary and secondary amino groups are attached to aliphatic carbon atoms because attachment to aromatic species (e.g. phenyl or naphthyl) or to a carbonyl group (—CO—) lowers the nucleophilicity of the —NH$_2$ or —NH— group thereby rendering them less reactive towards electrophilic groups in the dye under practical conditions. There may of course be amine groups in the nucleophilic agent which are not aliphatic primary or secondary amino groups provided the nucleophilic agent has at least one group, preferably at least two groups, selected from aliphatic primary amino and aliphatic secondary amino groups.

The aliphatic primary amino groups and secondary amino groups may be attached to the same carbon atom, for example as found in guanidine groups such as —NH—C(=NH)—NH$_2$ and —NH—C(=NH)—NH—. In hydrazines there can be one aliphatic primary amino group and one aliphatic secondary amino group, for example as in CH$_3$NH—NH$_2$, two aliphatic secondary amino groups, for example as in CH$_3$NH—NHCH$_3$, or two aliphatic primary amino groups, for example as in H$_2$NN(CH$_2$CH$_2$)$_2$NNH$_2$.

Preferred aliphatic primary amino groups are of the formula —CH$_2$—NH$_2$, —CH(R$^9$)—NH$_2$ and —C(R$^9$)$_2$—NH$_2$ and preferred aliphatic secondary amino groups are of the formula —CH$_2$—NH—CH$_2$—, —CH(R$^9$)—NH—CH$_2$— and —CH(R$^9$)—NH—CH(R$^9$)— wherein each R$^9$ independently is H or optionally substituted alkyl, aryl or aralkyl, more preferably H or C$_{1-4}$-alkyl, especially H or methyl.

Examples of the nucleophilic agents of the first aspect include compounds having 1 aliphatic primary amino group and no aliphatic secondary amino groups, e.g. methylamine, ethylamine, propylamine, H$_2$NCH$_2$CH$_2$SH; Compounds having 2 aliphatic primary amino groups and no aliphatic secondary amino groups, e.g. H$_2$NCH$_2$CH$_2$NH$_2$, H$_2$N(CH$_2$)$_3$ NH$_2$, H$_2$N(CH$_2$)$_4$NH$_2$, H$_2$N(CH$_2$)$_6$NH$_2$, H$_2$N(CH$_2$)$_8$NH$_2$, 1,2- and 1,3-diaminocyclohexane, H$_2$NCH(CH$_3$)CH$_2$NH$_2$, H$_2$NCH$_2$CH(NH$_2$)CO$_2$H, H$_2$NCH$_2$CH(CH$_2$CH$_3$)NH$_2$, Ph—CH(NH$_2$)—CH(NH$_2$)—Ph, H$_2$NCH$_2$C(CH$_2$CH$_3$)$_2$CH$_2$NH$_2$, H$_2$NCH$_2$CHOHCH$_2$NH$_2$, H$_2$NCH$_2$COCH$_2$NH$_2$, H$_2$NCH$_2$C(CH$_3$)$_2$CH$_2$NH$_2$, H$_2$NCH$_2$CH$_2$N(CH$_2$CH$_2$)$_2$NCH$_2$CH$_2$NH$_2$, H$_2$N(CH$_2$)$_3$N(CH$_2$CH$_2$)$_2$N(CH$_2$)$_3$NH$_2$, H$_2$N(CH$_2$)$_4$N(CH$_2$CH$_2$)$_2$N(CH$_2$)$_4$NH$_2$ and compounds of formula H$_2$NCH$_2$CH$_2$(OCH$_2$CH$_2$)$_n$NH$_2$ wherein n is from 1 to 9; Compounds having three aliphatic primary amino groups and no aliphatic secondary amino groups, for example 1,2,3-triaminopropane and (H$_2$NCH$_2$CH$_2$)$_3$N; Compounds having one aliphatic primary amino group and one aliphatic secondary amino group, for example (CH$_3$)$_2$CH—NHCH$_2$CH$_2$NH$_2$, CH$_3$NHCH$_2$CH$_2$NH$_2$, CH$_3$CH$_2$NHCH$_2$CH$_2$NH$_2$, HOCH$_2$CH$_2$NHCH$_2$CH$_2$NH$_2$, (CH$_3$O)$_3$Si(CH$_2$)$_3$NHCH$_2$CH$_2$NH$_2$, (CH$_3$)$_2$NCH$_2$CH$_2$NHCH$_2$CH$_2$NH$_2$, (CH$_3$CH$_2$)$_2$NCH$_2$CH$_2$NHCH$_2$CH$_2$NH$_2$, PhCH$_2$NHCH$_2$CH$_2$NH$_2$, (CH$_3$)$_2$CHNHCH(CH$_3$)CH$_2$NH$_2$, 3-aminopyrrolidine, 3-aminopiperidine, 2-aminomethylpiperidine, O$_2$CCH$_2$NHCH$_2$CH$_2$NH$_2$, cyclohexanyl—NH—CH$_2$CH$_2$NH$_2$ and H$_2$N(CH$_2$)$_3$NH(CH$_2$)$_3$NHCOCH$_3$; Compounds having two aliphatic primary amino groups and one aliphatic secondary amino group, for example H$_2$N(CH$_2$CH$_2$NH)$_2$H, H$_2$NCH$_2$CH$_2$NH (CH$_2$)$_2$NH$_2$, H$_2$NCH$_2$CH$_2$NH(CH$_2$)$_4$NH$_2$ and NH(CH$_2$CH(CH$_3$)—NH$_2$)$_2$; Compounds having a least two aliphatic secondary amino groups, especially from 2 to 8 secondary amino groups, for example HO(CH$_2$CH$_2$NH)$_2$CH$_2$CH$_2$OH, HO$_2$CCH$_2$NHCH$_2$CH$_2$NHCH$_2$CO$_2$H, PhCH$_2$NHCH$_2$CH$_2$NHCH$_2$Ph, (—NHCH$_2$CH$_2$—)$_{3,4\ or\ 5}$, piperazine, 2-methylpiperazine, 2,5- and 2,6-dimethylpiperazine, H$_2$N(CH$_2$CH$_2$NH)$_n$H wherein n is 3,4 or 5, CH$_3$NHCH$_2$CH$_2$NHCH$_3$, (—NHCH$_2$CH$_2$CH$_2$—)$_4$, 1,4,7,10,13-(6-hexaazacyclooctadecane), (CH$_3$O)$_3$Si (CH$_2$CH$_2$NH)$_2$CH$_2$CH$_2$CO$_2$CH$_3$ and (CH$_3$O)$_3$Si (CH$_2$CH$_2$NH)$_2$CH$_2$CH$_2$NH$_2$.

In a further aspect of the invention, when a dye of Formula (1) above, or a salt thereof is employed, it has advantageously been found that the nucleophilic agent is not restricted to the nucleophilic agents of the first aspect, although such agents can be employed in certain beneficial embodiments. Accordingly, a further aspect of the present invention provides a process for the coloration of a substrate comprising applying thereto a dye of Formula (1) and a nucleophilic agent having at least one, more preferably at least two, groups selected from thiols, thiones, aliphatic primary amino groups and aliphatic secondary amino groups.

In one embodiment of this further aspect, the nucleophilic agent has a molecular weight below 600 and in another the molecular weight is at least 600. The thiols, thiones, aliphatic primary amino groups and aliphatic secondary amino groups in the nucleophilic agent used in the further aspect are believed to react with the groups represented by V$^1$ or V$^2$ in dyes of Formula (1) to give a highly substantive species which has a strong affinity for substrates and low solubility in water.

The thiol (i.e. —SH) group which may be present in the nucleophilic agent used in the further aspect may, for example, be present in a substituent of formula —CO—SH or —NH—CO—SH used.

The thione group which may be present in the nucleophilic agent used in the further aspect is of the formula =S, for example as found in —PS(—OH)$_2$ and —O—PS(—OH)$_2$ and —O—PS(—OH)$_2$. A preferred thione group is of the formula >C=S, for example the agent may have a —CS—OH, —CS—NH$_2$, —NH—CS—OH or thiourea substituent. Preferred thione groups are of the formula —NR$^b$—CS—NR$^b$R$^b$ or —NR$^b$—CS—NR$^b$— wherein each R$^b$ independently is as hereinbefore defined, provided at least one R$^b$ is H.

In one embodiment, the nucleophilic agent used in the further aspect has a quaternary amine group, in addition to the one or more groups selected from thiols, thiones, aliphatic primary amino groups and aliphatic secondary amino groups. The quaternary amine group can in many cases increase affinity of the nucleophilic agent for substrates such as cotton leading to stronger dyeings and higher wash fastness. Examples of quaternary amine groups include dialkyl phenyl ammonium, e.g. Ph(CH$_3$)$_2$N$^+$—, Ph(CH$_3$CH$_2$)$_2$N$^+$—; optionally substituted pyridinium, e.g. 2-, 3- and 4-methyl pyridinium, 2-, 3-, 4-carboxy pyridinium; N-alkyl-pyridinyloxy, e.g. N-methyl-4-pyridinyloxy, N-methyl-2-pyridinyloxy and N-ethyl-4-pyridinyloxy; tri(alkyl)ammonium, e.g. (CH$_3$)$_3$N$^+$—, (CH$_3$CH$_2$)$_3$N$^+$—, CH$_3$(CH$_3$CH$_2$)$_2$N$^+$—; (CH$_2$)$_5$N$^+$—; (CH$_2$CH$_2$OCH$_2$CH$_2$)N$^+$—; and those derived from quinuclidine and diazobicyclo octane.

The thiol or thione group which may be present in the nucleophilic agent used in the further aspect can be attached to a heterocyclic ring, preferably a 5 or 6 membered ring containing 1, 2 or 3 atoms selected from nitrogen, oxygen and sulphur, to give what are hereinafter referred to as heterocyclic thiol or thione groups respectively. The preferred heterocyclic thiol or thione group contains 1, 2 or more preferably 3 nitrogen atoms. Preferred heterocyclic thiol or thione groups carry 1 or 2 groups selected from —SH and =S. Examples of heterocyclic thiols and thiones include groups for Formula (3) and (4):

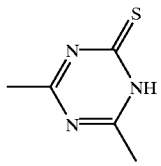

(3)

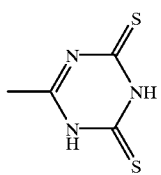

(4)

The groups of Formula (3), Formula (4) and the thioureas may exist in tautomeric forms other than those illustrated and these are included in the present invention. By way of illustration tautomers of groups of Formula (3) include those illustrated below by Formulae (3a) and (3b) and tautomers of groups of Formula (4) include those illustrated by (4a), (4b), (4c) and (4d):

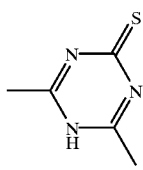

(3a)

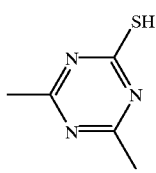

(3b)

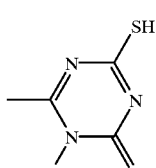

(4a)

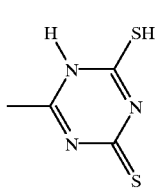

(4b)

-continued

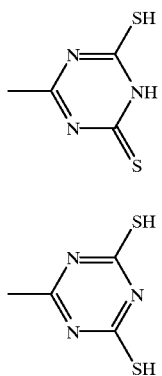

(4c)

(4d)

The nucleophilic agent used in the further aspect is preferably a triazine compound having 1, 2 or 3 groups selected from thiols and thiones, especially trithiotriazine (i.e. s-triazine having three —SH groups) or a group of the formula:

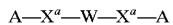

A—X$^a$—W—X$^a$—A wherein:
each A is a group of Formula (4) as hereinbefore defined;
each X$^a$ independently is oxygen, sulphur or —NR$^c$—;
each R$^c$ independently is H or alkyl; and
W is a divalent organic linker group.

R$^c$ is preferably H or C$_{1-4}$-alkyl.
W is preferably an alkylene, arylene or aralkylene group. The preferred alkylene group is optionally substituted C$_{2-4}$-alkylene. The preferred arylene group is optionally substituted phenylene or naphthylene. The preferred aralkylene group is optionally substituted benzylene or xylylene. When W is substituted the substituent(s) are preferably selected from halo, especially chloro; nitro; alkoxy, especially C$_{1-4}$-alkoxy; alkyl, especially C$_{1-4}$-alkyl; cyano; hydroxy; —SH; amino; W may contain or be free from chromophores.

Another preferred nucleophilic agent in the further aspect is of Formula (5) or (6):

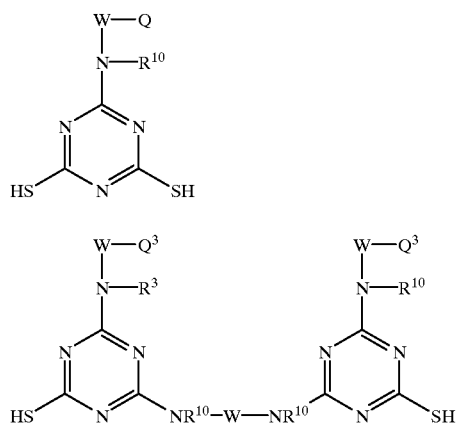

wherein each R$^{10}$ independently is H or optionally substituted alkyl, preferably H or C$_{1-4}$-alkyl; each W independently is as hereinbefore defined; and each Q$^3$ is a quaternary amine group. Preferred quaternary amine groups are as hereinbefore described. Another preferred nucleophilic agent is of formula Q$^3$—W—CH$_2$SH wherein Q$^3$ and W are as hereinbefore defined.

Imine nucleophilic agents having a molecular weight of at least 600 which can be employed in the further aspect include polyethylene imine ("PEI") 600, PEI 1000, PEI 1800, PEI 60,000 and PEI 100,000.

In both the first aspect and the further aspect of the present invention, the nucleophilic agent is preferably water soluble.

It is possible to select particularly valuable combinations of dyes of Formula (1) and nucleophilic agents for use in the process by measuring how much dye is immobilised under exhaust dyeing conditions. Very high immobilisation under these conditions indicates that the dye and nucleophilic agent form a highly substantive species and this behaviour is reflected in other dyeing processes, e.g. printing, continuous and semi-continuous dyeing.

The dye having at least two electrophilic groups and the nucleophilic agent may be applied to the substrate in either order or simultaneously. Preferably said dye is applied to the substrate before the nucleophilic agent as this allows the dye to colour the substrate evenly before being fixed by the nucleophilic agent.

A preferred process according to the invention for coloration of a substrate comprises the steps:
(a) applying an aqueous solution of a dye having at least two electrophilic groups to the substrate;
(b) bringing a nucleophilic agent having a molecular weight below 600 and at least one group selected from aliphatic primary amino groups and aliphatic secondary amino groups into contact with the substrate.

A process according to the further aspect invention for the coloration of a substrate comprises the steps:
(a) applying a dye of Formula (1) above to the substrate.
(b) bringing a nucleophilic agent into contact with the substrate.

A convenient way of performing step (a) is to immerse the substrate in an aqueous solution of said dye. Step (b) may be achieved by adding the nucleophilic agent to the aqueous solution.

In another process, steps (a) and (b) are employed as described above except that said dye is used in step (b) in place of the nucleophilic agent, and said nucleophilic agent is used in step (a) in place of the dye.

The simultaneous application of the dye having at least two electrophilic groups and the nucleophilic agent is particularly useful where said dye and the nucleophilic agent do not react together very quickly at ambient temperature or neutral pH and an elevated temperature and/or pH is required to make the two species react. In this case said dye has the opportunity to colour the substrate evenly before fixing by raising the temperature and/or pH.

The nucleophilic moieties in the nucleophilic agent, particularly when the nucleophilic moieties are amine groups, can be masked using a protecting group if so desired. In this way, particularly storage stable compositions comprising the dye having at least two electrophilic groups and a masked nucleophilic agent can be provided. The protecting group can be removed from the nucleophilic agent before, during or after it has been applied to a substrate, for example by treating the agent with acid, base or by heating it. Examples of protecting groups which can be used to mask the nucleophilic agent include CF$_3$CO, CH$_3$CO and all other known protecting groups for nucleophilic moieties, particularly for nitrogen and sulphur nucleophiles.

The amount of said dye in the aqueous solution will depend upon the depth of shade required and solubility of the dye. Typically the aqueous solution contains 0.001% to 40% by weight of the dye relative to the weight of water, preferably 0.01% to 30% more preferably 0.01% to 5%.

The ratio of dye to the nucleophilic agent or masked nucleophilic agent (by weight) applied to the substrate is preferably in the range 100:1 to 1:100, more preferably 20:1 to 1:20, particularly 19:1 to 1:19, especially 9:1 to 1:9, more especially 3:1 to 1:3. Factors influencing the preferred ratio include the relative molecular weights of the dye and nucleophilic agent, the number of electrophilic groups in the dye and the number of nucleophilic moieties, for example, thiol, thione, aliphatic primary and secondary amino groups in the nucleophilic agent. Because the dye and nucleophilic agent are believed to join together by reaction of the electrophilic groups in the dye (V groups in a dye of Formula (1)) and the nucleophilic moieties for example thiol, thione and/or amino groups in the nucleophilic agent, it is preferred that the relative amounts (in moles) of dye and nucleophilic agent is chosen such that the total number of nucleophilic moieties, including thiol, thione, aliphatic primary and secondary amino groups, is about equal to or exceeds the number of electrophilic groups, and when dyes of Formula (1) are employed, is preferably about equal, e.g. in the range 5:4 to 4:5. However, if one wishes the dye may be used in excess such that fibre-reactive electrophilic groups remain present which can form covalent bonds with cellulosic substrates in a conventional manner.

The dye and the nucleophilic agent are preferably applied to the substrate as an aqueous solution, more preferably as a solution in water. In the process for the coloration of a substrate according to the first or second aspects of the invention, comprising applying thereto a dye and a nucleophilic agent as hereinbefore decribed, the dye and nucleophilic agent are preferably heated and/or basified thereby causing the dye and nucleophilic agent to react together.

During the process for coloration of a substrate it is preferred to heat and/or basify the substrate either before step (a), during step (a), between step (a) and step (b), during step (b), after step (b), or any combination thereof. Heating and/or basifying during step (a) can be useful to exhaust dye onto the substrate before bringing the nucleophilic agent into contact with the product of step (a), for example at the same temperature or, for economy, at a lower temperature. Preferably the aqueous solution of dye containing at least two electrophilic groups is applied to the substrate at an elevated temperature, (e.g. at a temperature between 40° C. and 300° C., preferably 45° C. and 200° C., especially 45° C. and 140° C.) and the nucleophilic agent is applied to the substrate at a lower temperature (e.g. at a temperature between 0° C. and 110° C., preferably 10° C. and 85° C.).

The heating may be achieved by any means, for example by an electrical means such as a heating mantle, infra-red, microwave or ultrasound or by using steam.

When the present process is performed by basifying a mixture of said dye and nucleophilic agent it is preferred that the basifying is from a first pH to a second pH at least 0.5 pH units higher than the first pH, more preferably at least 1 pH unit higher, especially at least 2 pH units higher, more especially at least 3 pH units higher and optionally up to 7 pH units higher than the first pH. The first pH is preferably between pH 0 and pH 8.5, more preferably between pH 2 and pH 8, especially between pH 4 and pH 8, more especially between pH 6 and pH 8 and especially preferably approximately pH 7.

Preferably basification is achieved using an alkaline earth or alkali metal, base or salt, more preferably an alkali metal hydroxide, carbonate or bicarbonate, especially a sodium or potassium hydroxide, carbonate, bicarbonate or composition thereof. In some cases the nucleophilic agent is sufficiently basic to avoid the need for any other base being added.

Although formulae have been shown in their unionised or free acid form in this specification, for example —SO$_3$H, these formulae include the ionised and salt forms, particularly salts with alkali metals such as sodium, potassium or lithium or mixed sodium/lithium salts, ammonium salts and salts where the nucleophilic agent acts as a cation.

A further feature of the present invention provides a composition comprising:

(i) a dye having at least two electrophilic groups; and (ii) a nucleophilic agent or masked nucleophilic agent, the nucelophilic agent having, in unmasked form, a molecular weight below 600 and at least one group selected from aliphatic primary amino groups and aliphatic secondary amino groups.

A particularly preferred composition comprises:

(i) a dye of Formula (1); and (ii) a nucleophilic agent having at least one group selected from thiols, thiones, aliphatic primary amino groups and aliphatic secondary amino groups.

The preferred dye and nucleophilic agents contained in the compositions are as hereinbefore described in relation to the present process. The preferred ratio of dye to nucleophilic agent is as hereinbefore described. The composition may contain one or more of the dyes and one or more of the nucleophilic agents.

In the present process it is preferred that the composition is heated from a first temperature to a second temperature at least 20° C. higher than the first temperature, more preferably at least 30° C. higher, especially at least 40° C. higher and optionally up to 200° C. or 300° C. higher than the first temperature. The first temperature is preferably between 0° C. and 40° C., more preferably between 5° C. and 40° C., especially between 10° C. and 40° C. The composition may be heated by any means, for example by an electrical means such as a heating mantle, infra-red, microwave or ultrasound or by using steam. The heating may be done at neutral, acid or alkali pH, preferably at a pH above 7. The composition may be basified by adding an alkaline solution of the dye to nucleophilic agent, by adding an alkaline solution nucleophilic agent to the dye, or by adding alkaline earth or alkali metal, base or salt to a solution of the composition.

In one embodiment of the present process, the composition contains a buffer which maintains the pH in the range 5 to 8.5, more preferably 6 to 8. The use of a buffer can lead to dyeings which are more level. As examples of suitable buffers there may be mentioned phosphate, borate and citrate buffers, especially Na$_2$HPO$_4$, K$_2$HPO$_4$ and sodium tripolyphosphate.

As there is no need to use a free-radical initiator in the present process it is preferred that the process is performed in the absence of such an initiator.

The dyes of Formula (1) may also be applied to substrates by conventional methods used for reactive dyes, for example exhaust, continuous, semi-continuous and pad-batch dyeing and printing. Thus the dye of Formula (1) can be applied to a substrate, preferably in conjunction with an acid-binding agent, especially an alkali metal hydroxide, carbonate or bicarbonate. In one process an aqueous solution of the dye of Formula (1) or salt thereof is applied to a substrate at a temperature between 70° C. and 140° C. (preferably between 90° C. and 131° C.), the temperature is lowered to a temperature between 50° C. and 70° C. (preferably between 55° C. and 65° C.) and an acid-binding agent is added to the aqueous solution.

Dyes used in the process may be prepared by analogous methods to those described in the dyestuff art except that intermediates are selected which will result in the dye having the aforementioned electrophilic groups.

Alternatively, dyes according to the invention containing an azo chromophore may be prepared by coupling two suitable precursors.

The substrate used in the process is preferably leather or a textile material, especially a natural, semi-synthetic or synthetic material.

Examples of natural textile materials include wool, silk, hair and cellulosic materials, particularly cotton, jute, hemp, flax and linen. Preferred cotton materials are Sea Island, Egyptian, American, Peruvian, Asiatic and Indian cottons, for example cottons having a staple length of 2.5 to 5 cm, a denier of 1 to 2 and a moisture content of at least 8%.

Examples of synthetic and semi-synthetic materials include polyamides, polyesters, polyacrylonitriles and polyurethanes.

A further feature of this invention comprises a polymer or oligomer obtained or obtainable by heating or basifying or heating and basifying a composition according to the present invention. Preferably the heating and/or basifying is from first to second temperatures and pHs as described hereabove.

The invention is further illustrated by the following examples in which all parts and percentages are by weight unless otherwise stated.

In the following Examples the extent of immobilisation (%) was determined by the method described earlier in the specification. All λmax were recorded in water.

Stage (c)—Further Dyeing Processes

The method stage (b) was varied as indicated below to give high fastness dyeings:

as stage (b) but using piperazine in place of tris(2-aminoethyl)amine,
as stage (b) but using 1,4-diaminobutane in place of tris(2-aminoethyl)amine,
as stage (b) but using NaCl in place of sodium sulphate,
as stage (b) but heating to 60° C. instead of 90° C.,
as stage (b) but heating to 120° C. instead of 90° C.

EXAMPLE 2

Stage (a)—Dye Preparation

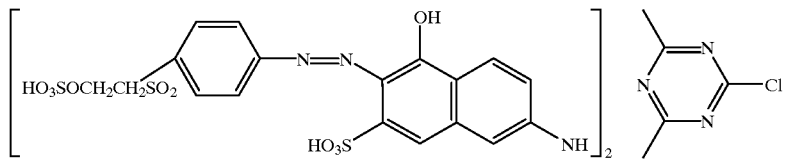

EXAMPLE 1

Stage (a)—Dye Preparation

Preparation of

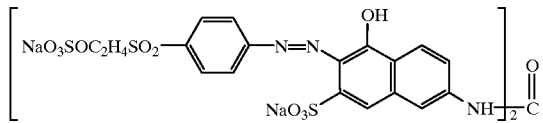

A solution of 4(β-sulphatoethylsulphonyl) aniline (6.2 g) in water (50 ml) was adjusted to pH 6 using 2N sodium carbonate. 2N sodium nitrite (12 ml) was added and the solution was cooled in ice, then added to a mixture of ice and concentrated hydrochloric acid (6 ml). After stirring at 0–5° C. for 2 hours excess nitrous acid was destroyed by the addition of sulphamic acid to give a diazo component.

The suspension of diazo component was added to a solution of 5,5'-dihydroxydinaphth-2,2'-yl-urea-7,7'-disulphonic acid (5.5 g) in water (150 ml) at pH 3 and 0–5° C. After stirring for 30 minutes, the solution was allowed to warm to room temperature. An approximately equal volume of iso-propanol was added to the mixture and the resultant orange precipitate was filtered off to give the title product (6.7 g) having two electrophilic groups and a λmax at 482 nm.

Stage (b)—Dyeing Process

The title product (0.10 g) was dissolved in water (30 ml) containing pH 7 buffer and sodium sulphate (0.75 g). A piece of cotton (5 g) was added and the solution was heated from 30° C. to 90° C. at the rate of 1 degC.min$^{-1}$. After 30 minutes at 90° C. tris(2-aminoethyl)amine (0.05M solution, 1.2 ml, a nucleophilic agent having three aliphatic primary amino groups and no aliphatic secondary amino groups) was added and heating was continued at 90° C. for a further hour. The resultant dyebath was colourless and the cotton was dyed bright orange with excellent wash-fastness.

Cyanuric chloride (3.53 g) was dissolved in acetone (30 ml) and added to ice water (50 ml). 1-hydroxy-6-aminonaphthalene-3-sulphonic acid ("J-acid", 5 g) was dissolved in water (50 ml) at pH 6.5 and added dropwise to the cyanuric chloride suspension, maintaining the mixture at pH 2 and a temperature of 0–5° C. After stirring for 3 hours, a further 5 g of J-acid in water (50 ml) at pH 6.5 was added and the resultant mixture was stirred at room temperature and pH 6 overnight, and finally at 40° C. for 2 hours. The mixture was cooled and the product salted out to give 18.5 g of a coupling component.

4-(β-sulphatoethylsulphonyl)aniline (3.55 g) was dissolved in water (50 ml) at pH 7, and 7 ml of a 2M solution of sodium nitrite was added. This solution was added to ice water (50 ml) and concentrated HCl (4 ml) and diazotised at 0–5° C. for 2 hours. Excess nitrous acid was destroyed using sulphamic acid and the suspension was adjusted to pH 3. The above coupling component (4.0 g) was dissolved in water (100 ml) and added dropwise at pH 3. After stirring at 0–5° C. for 2 hours, the solution was allowed to warm to room temperature overnight. Propan-2-ol was added and the precipitate filtered off and dried to give the title dye having two electrophilic groups (4.9 g) and λmax at 481 nm.

Stage (b)—Dyeing Process

The title product was applied to cotton using the method described in Example 1, stage (b). The resultant dyebath was colourless and the cotton was dyed a bright orange with excellent wash-fastness.

EXAMPLE 3

The method of Example 2 was followed except that in place of 4-(β-sulphatoethylsulphonyl)aniline there was used 2-methoxy-5-(β-sulphatoethylsulphonyl)aniline. The resultant dye was applied to cotton using the method of Example 1, stage (b), to give a brilliant yellowish-red dyeing with excellent wash-fastness. Furthermore, the dyebath was colourless at the end of dyeing.

EXAMPLE 4

Stage (a)—Dye Preparation

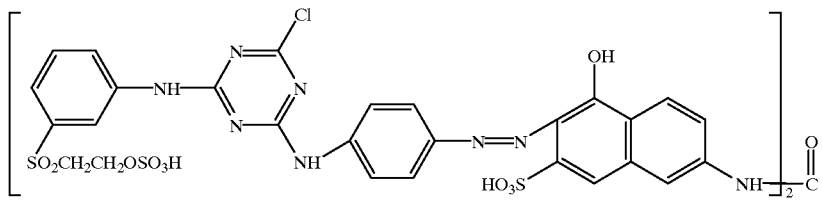

4-Nitroaniline (2.76 g) was stirred in ice water (100 ml) containing concentrated HCl (6 ml) and 2M $NaNO_2$ solution (11 ml) was slowly added. The solution was stirred at 0–5° C. for 1.5 hours and excess nitrous acid was destroyed by the addition of sulphamic acid. Carbonyl J-acid (5.48 g) was dissolved in water (200 ml) and added dropwise to the diazo solution at pH 3–4. The reaction was then stirred at pH 3–4 and 0–5° C. for 3 hours before allowing to warm to room temperature overnight. The resultant precipitate was filtered off, washed with a small amount of water and dried to give 10 g of a diazo dinitro compound.

The diazodinitro compound (5 g) was stirred in water (100 ml) at pH 8 and room temperature. Sodium sulphide nonahydrate (7.09 g) and sodium bicarbonate (2.5 g) were mixed in water and added to the solution. After stirring for 2 hours, the solution was carefully acidified to pH 2 with concentrated HCl and the precipitate filtered off and dried to give 5.0 g of a diamino diazo compound.

Cyanuric chloride (1.72 g) was dissolved in acetone (30 ml) and added to ice water (50 ml). 3-(β-sulphatoethylsulphonyl)aniline (2.5 g) was dissolved in water (50 ml) at pH 7 and added dropwise to the cyanuric chloride dispersion at pH 2–3 and 0–5° C. The reaction was stirred at 0–5° C. and pH 2 for 2 hours. The above diamino diazo compound (3.5 g) was dissolved in water (100 ml) at pH 7 and was added at pH 7 and room temperature. The reaction was stirred at pH 7 overnight, then 10% w/v NaCl was added. The precipitate was filtered off and dried to give the title product (4 g) as a bluish-red dye having a λmax at 509 nm.

Stage (b)—Dyeing Process

The title dye (0.10 g) was dissolved in water (30 ml), and cotton (5 g) was added. The bath was heated from 30° C.–90° C. over 1 hour and sodium sulphate (0.75 g) was added. After a further 30 minutes, tris(2-aminoethyl)amine (0.0024 g) was added and the dyebath heated at 90° C. for 1 hour. The exhausted dyebath was completely colourless and the cloth was dyed in a dull purple shade with excellent wash-fastness.

EXAMPLE 5

Preparation of

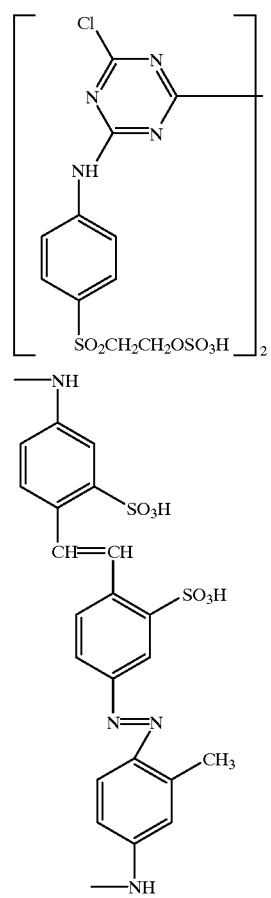

Stage (a)

4-Amino-4'-nitro-2,2'-stilbene-disulphonic acid (69% strength, 28 g) was dissolved in ice/water (200 g) and conc. HCl (12 ml), and then $NaNO_2$ solution (2M, 24 ml) was added dropwise whilst maintaining the temperature below 5° C. After stirring for ½ hour, excess nitrous acid was destroyed using sulphamic acid and 3-methyl aniline (5 g) in acetone (50 ml) was added. The pH was raised to 5–6 using 2M NaOH and the product was filtered off and dried to give a monoazo solid (29 g).

The monoazo solid (7.0 g) was dissolved in water at pH 8 and a solution of sodium sulphide hydrate (8.7 g) in water (50 ml) was added. The mixture was stirred for 3 hours, the pH was adjusted to 5 and a 10% w/v salt solution was added. The resultant precipitate was filtered off and dried to give 6.3 g of solid.

Stage (b)

A solution of cyanuric chloride (2.28 g) in acetone (100 ml) was added over 10 minutes to a solution of 4-(β-sulphatoethyl sulphonyl)aniline (3.45 g) in water (100 ml) at 0–5° C. After 1 hour the product of stage (a) (3.0 g) in water (100 ml) was added and the mixture was stirred at ambient temperature for 14 hours. A 10% w/v salt solution was added and the resultant precipitate was filtered off, washed with isopropanol and dried to give the title product (5.1 g) having a λmax at 407 nm.

Stage (c)—Dyeing

The title dye (0.1 g) was stirred in an aqueous pH 7 buffer solution (30 ml) and the mixture was heated to 50° C. at a rate of 1° C. per minute. A piece of cotton (5 g) was added and the temperature was raised to 90° C. at a rate of 1° C. per minute. Sodium sulphate (0.75 g) was added and, after 30 minutes, tris(2-aminoethyl) amine (1.05 ml, 0.05M solution) was added and the temperature was maintained at 90° C. for 1 hour. The cotton was dyed an attractive reddish yellow shade, leaving the liquors essentially colourless.

The extent of immobilisation (measured using the test described earlier in the specification) was found to be 99.5%.

EXAMPLE 6

The method of Example 5 was repeated except that in place of 3-methylaniline there was used 3-methyl-6-methoxy aniline. The resultant product had a λmax at 446 nm.

EXAMPLE 7

The method of Example 5 was repeated except that in place of 3-methylaniline there was used 3-ureido aniline. The resultant product had a λmax at 423 nm.

EXAMPLE 8

The method of Example 4 was repeated except that in place of 3-(β-sulphatoethylsulphonyl)aniline there was used 4-(β-sulphatoethylsulphonyl) aniline. The resultant dye had a λmax at 517 nm.

EXAMPLE 9

Stage (a)—Dye Preparation

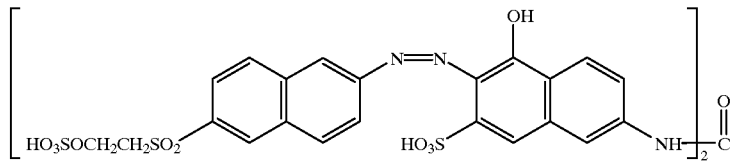

The title dye was prepared by the general method of Example 1 except that in place of 4-(β-sulphatoethylsulphonyl)aniline there was used 6-(β-sulphatoethylsulphonyl)-2-naphthylamine. The title dye had a λmax at 504 nm.

Stage (b)—Dyeing Procedure

The product from stage (a) (0.20 g) was dissolved in pH 7 buffer (50 ml) and cotton (5 g) was added. The mixture was heated to 95° C. over 1 hour, left for 15 minutes, Na₂SO₄ (1.25 g) was added and the mixture was then kept at 95° C. for a further hour. The cotton was removed from the essentially colourless dye liquor and cut into two.

One half of the cotton was stirred for 1 hour at 90° C. in a mixture of water (25 ml) and 1,4-diaminopiperazine solution (0.05M, 1.5 ml). The other half was stirred in a mixture of water (25 ml) and (H₂NCH₂CH₂)₃N solution (0.05M, 2 ml). In both cases the amine solutions were only weakly coloured.

When the immobilisation test described earlier was performed using the title dye (0.100 g) and tris(2-aminoethyl) amine (0.013 g) an immobilisation of 97% was observed.

EXAMPLE 10

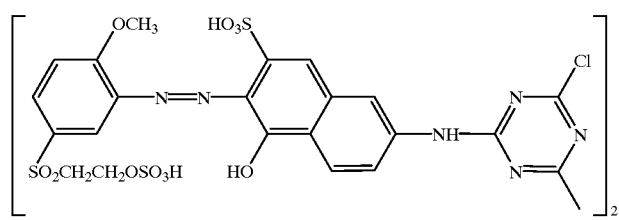

-continued

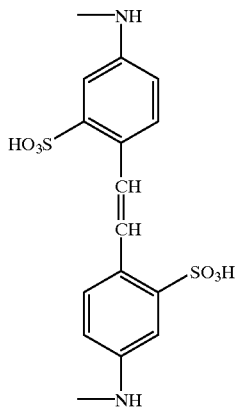

Stage (a)

Cyanuric chloride (4.06 g) was dissolved in acetone (30 ml) and added to ice/water (50 ml). To this was added a solution of J-acid (4.78 g) in water (100 ml), maintaining the mixture at pH 2–3 and 0–5° C. The mixture was stirred for a further 3 hours at 0–5° C. to give a suspension of J-acid dichlorotriazine.

2-methoxy-5-(β-sulphatoethylsulphonyl)aniline (6.22 g) was dissolved in water (50 ml) at pH 7 with 2N sodium nitrite (11 ml). This was added to ice and conc. hydrochloric acid (6 ml) and diazotised at 0–5° C. for 2 hours. Excess nitrous acid was destroyed by the addition of sulphamic acid. The resultant diazo mixture was added dropwise to the suspension of J-acid dichlorotriazine at pH 3–4 and stirred at room temperature for 40 hours. The product was filtered off and dried to give a reddish powder (14.7 g).

Stage (b)

4.8 g of the product from stage (a) was stirred in water (150 ml) at pH 6.5 and room temperature. 4,4'-diaminostilbene-2,2'-disulphonic acid (0.99 g) in water (100 ml) was added and the solution was stirred at pH 6–7 for 40 hours. The product was precipitated out by the addition of propan-2-ol, filtered off and dried to give 4.3 g of the title dye as a reddish-orange powder with λmax at 489 nm.

Stage (c)—Dyeing

The title dye (0.10 g) was dissolved in pH 7 buffer solution (30 ml), cotton was added and the mixture was heated from 30° C. to 90° C. at 1 degC.min$^{-1}$. Sodium sulphate (0.75 g) was added, and the bath was held at 90° C. for a further 30 minutes. Tris(2-aminoethyl)amine (0.013 g) was added and the bath was heated at 90° C. for 1 hour. The exhausted dyebath was essentially colourless, and the cloth was dyed bright yellowish-red with excellent wash fastness.

EXAMPLE 11

Stage (a)

4-(β-Sulphatoethylsulphonyl)aniline (28.1 g) was dissolved in water (150 ml), adjusted to pH 6 and 55 ml of 2N sodium nitrile was added. This solution was added to a mixture of ice and concentrated HCl (25 ml) and diazotised at 0–5° C. for 2 hours. Excess nitrous acid was destroyed by the addition of sulphamic acid. M-Toluidine (10.7 g) in ethanol (100 ml) was added to the diazo suspension and the mixture was stirred at 0–5° C., pH 3–4 for 2 hours before warming to room temperature. The product was filtered-off and dried to give 4-amino-2-methyl-4'-(β-sulphatoethylsulphonyl)azobenzene (31.9 g).

The above product (4.80 g) was dissolved in a mixture of water (75 ml) and tetrahydrofuran (50 ml) at pH 6.5. 2N Sodium nitrite was added (6.5 ml) and the solution was poured onto ice and concentrated HCl (4 ml) and diazotised at 10–20° C. for 2 hours. Excess nitrous acid was destroyed using sulphamic acid to give a diazo solution. 5,5'-Dihydroxydinaphth-2,2'-urea-7,7'-disulphonic acid (2.75 g) was dissolved in water (75 ml) and tetrahydrofuran (50 ml), added to the above diazo solution and stirred at room temperature, pH 6.5 overnight. The solution was acidified to pH 2.5 and screened to remove excess diazo, and the product was precipitated out by the addition of isopropanol. On drying this gave the title product as a dark red solid (6.60 g) with a λmax at 540 nm.

Stage (b)—Dyeing

The title dye (0.10 g) was dissolved in pH 7 buffer solution containing a 5 g piece cotton (30 ml) and heated from 30° C. to 95° C. at 1 degC.min$^{-1}$. After 15 minutes Na$_2$SO$_4$ (0.75 g) was added followed an hour later by 2 ml of a 0.05M solution of tris(2-aminoethyl)amine. The bath was maintained at 95° C. for a further hour. The exhausted dyebath was essentially colourless and the cotton was dyed a dull bluish-red shade.

EXAMPLE 12

The method of Example 11 was repeated except that in place of meta-toluidine there was used 3-acetamido-6-

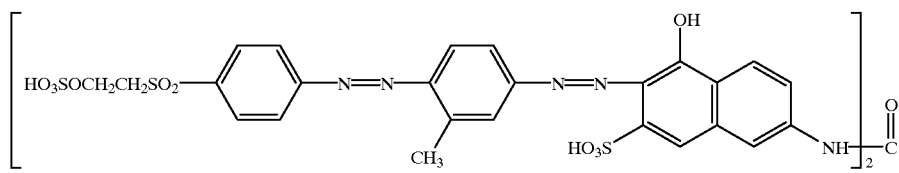

sulpho aniline, and in place of 5,5'-dihydroxydipnaphth-2,2'-urea-7,7'-disulphonic acid there was used the coupling component from Example 2. The resultant bluish-red solid had a λmax at 537 nm.

EXAMPLE 13

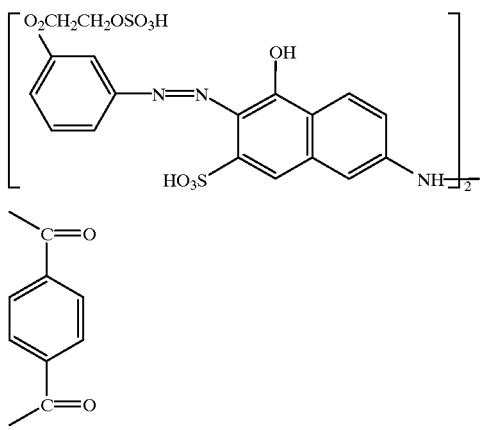

Stage (a)

J-Acid (23.4 g) was dissolved in water (250 ml) at pH 7 and cooled to 0–5° C. Terephthaloyl chloride (10.2 g) in acetone (100 ml) was added dropwise to this solution, and after stirring at 0–5° C. and pH 6 for 4 hours, the mixture was allowed to warm to room temperature. A small additional portion of terephthaloyl chloride (0.50 g) in acetone (20 ml) was added and after stirring for a further hour the product was filtered off and washed with acetone. This gave 33.5 g of a coupler.

3-(β-sulphatoethylsulphonyl)aniline (1.55 g) was dissolved in water (50 ml) at pH 6, and 2N sodium nitrite (3 ml) was added. This was added to ice and concentrated HCl (1.6 ml) and diazotised at 0–5° C. for 1 hour. Excess nitrous acid was destroyed by adding sulphamic acid.

The above coupler (1.80 g) was dissolved in a mixture of water (75 ml) and acetone (75 ml) and added dropwise to the diazo at pH 3. The solution was stirred at 0–5° C. pH 3–3.5 for 4 hours then allowed to warm to room temperature. Sufficient isopropanol was added to cause precipitation and the product was filtered off and dried to give the title dye (3.0 g) having a λmax at 478 nm.

Stage (b)

The title dye (0.03 g) was dissolved in water (14 ml) and 2M $Na_2CO_3$ (2 ml) was added. Sufficient $N(CH_2CH_2NH_2)_3$ (0.05M solution) was added to give a 3:1 Nu:Dye ratio. 5 g of cotton was impregnated with the solution, excess solution was squeezed out of the cotton and it was wrapped in polythene and left at room temperature for 24 hours. The dye was fixed very firmly to the cotton and little coloured was washed out, even when the dyed cotton was heated in boiling water.

EXAMPLE 14

The method of Example 13 was repeated except that in place of 3-(β-sulphatoethylsulphonyl)aniline there was used 4-(β-sulphatoethylsulphonyl)aniline.

EXAMPLE 15

The method of Example 11 was repeated except that in place of 4-(β-sulphatoethylsulphonyl)aniline there was used 3-(β-sulphatoethylsulphonyl)aniline.

EXAMPLE 16

The method of Example 10 was repeated except that in place of 2-methoxy-5-(β-sulphatoethylsulphonyl)aniline there was used 4-(β-sulphatoethylsulphonyl)aniline.

EXAMPLE 17

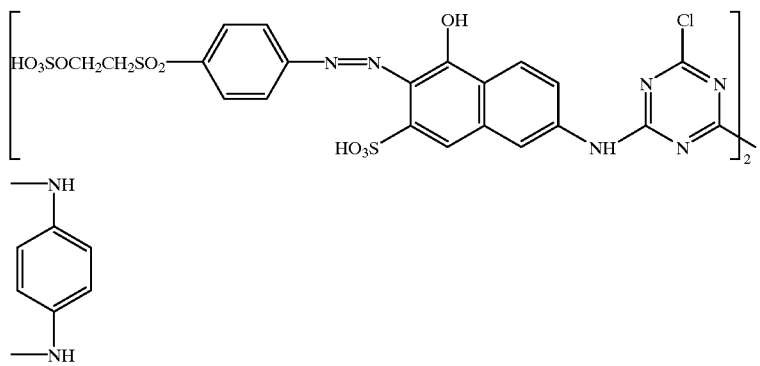

Stage (a)

Cyanuric chloride (4.06 g) was dissolved in acetone (30 ml) and added to ice/water (50 ml). A solution of J-acid in water (100 ml) at pH 7 was added dropwise and the reaction was stirred, maintaining the mixture at 0–5° C., pH 2–2.5 until it was negative to Ehrlich's reagent.

4-(β-sulphatoethylsulphonyl)aniline (5.62 g) was dissolved in water (50 ml) at pH 7 and 2N sodium nitrite (11 ml) was added. This solution was poured onto ice and concentrated HCl (6 ml) and diazotised for 1 hour before destroying excess nitrous acid using sulphamic acid. The diazo product was then added to the above suspension of J-acid dichlorotriazine and the mixture was stirred at pH 3–4, 0–5° C. for 3 hours. A solid was isolated by precipitation with isopropanol and filtering.

The above solid (5 g) was dissolved in water (100 ml). p-phenylenediamine (0.37 g) in water (50 ml) was added and the solution was stirred at pH 4–5 and room temperature for 20 hours. Sufficient ethanol was added to cause precipitation and the dye was filtered-off and dried. The title product was obtained as an orange solid with a λmax at 480 nm.

EXAMPLE 18

The method of Example 40 was repeated except that in place of 1,4-phenylene diamine there was used a compound of the formula:

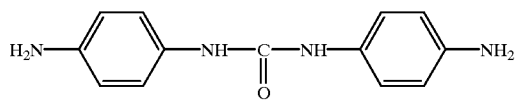

EXAMPLE 19

The method of Example 2 was repeated except that in place of 4-(β-sulphoatoethylsulphonyl)aniline there was used 2-amino-6-(β-sulphatoethylsulphonyl)naphthalene. The product had a λmax at 493 nm.

EXAMPLE 20

The method of Example 1 was repeated except that in place of 4-(β-sulphatoethylsulphonyl)aniline there was used 4-methoxy-3-(β-sulphatoethylsulphonyl)aniline.

EXAMPLE 21

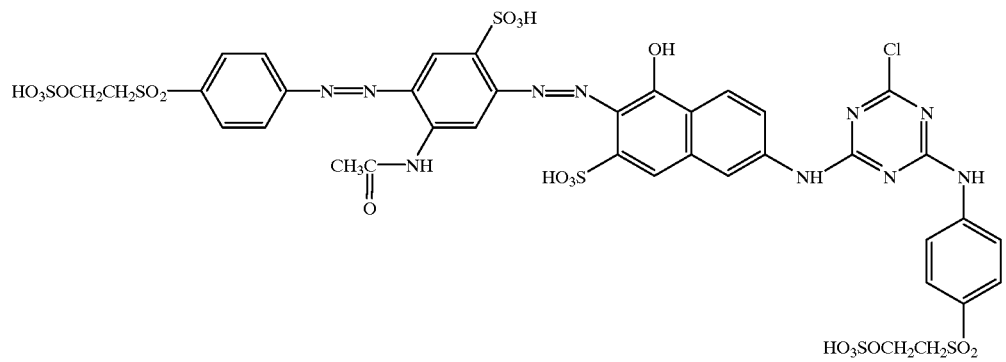

Stage (a)

Cyanuric chloride (3.69 g) was dissolved in acetone (30 ml) and added to ice/water (50 ml). A solution of 4-(β-sulphatoethylsulphonyl)aniline (5.62 g) in water at pH 6 was added dropwise, keeping the reaction mixture at pH2. This was stirred for 2 hours at 0–5° C. The mixture was allowed to warm to room temperature and a pH 6 solution of J-acid (4.70 g) in water (50 ml) was added dropwise. The solution was stirred at pH 6 overnight, and the coupler was isolated by removing the water under reduced pressure.

Stage (b)

4-(β-sulphatoethylsulphonyl)aniline (28.1 g) was dissolved in water (150 ml) at pH 6, 2N sodium nitrite was added (55 ml) and the mixture was poured slowly onto ice and concentrated HCl (25 ml). After diazotising at 0–5° C. for 2 hours, excess nitrous acid was destroyed by the addition of sulphamic acid. 5-Acetamidoaniline-2-sulphonic acid (23.0 g) was dissolved in water (150 ml) at pH 6 and cooled in ice. This was slowly added to the diazo solution and the mixture was stirred at pH 3.5, 0–5° C. for 2 hours before allowing to warm to room temperature. The solution was adjusted to pH 1.5, and the product was filtered off and dried.

Stage (c)

The product from stage (b) (2.35 g) was dissolved in water at pH 6 and 2N sodium nitrite (2.4 ml) was added. The solution as added to ice and concentrated HCl (1.5 ml) and diazotised for 1 hour at 0–5° C. Excess nitrous acid was destroyed using sulphamic acid.

The coupler from stage (a) (2.93 g) was dissolved in water (50 ml), and the diazo was added to this and then stirred at 0–5° C., pH 3–4 for 2 hours. The solution was warmed to room temperature adjusted to pH 2.5 and filtered. The product was purified by redissolving in water (100 ml) and adding salt (20% w/v). The resultant title product was filtered off and dried to give a bluish-red solid with λmax at 526 nm.

EXAMPLE 22

The title dye from Example 1 (0.10 g) was dissolved in a dyebath containing pH 7 buffer solution (30 ml), a 5 g piece of cotton was added, and the bath was heated to 95° C. at 1 degC.min$^{-1}$. After 15 minutes at 95° C., Na$_2$SO$_4$ (0.75 g) was added, followed an hour later by 1,4-diaminopiperazine (0.017 g). The bath was kept at 95° C. for a further hour. The resultant dyebath was only weakly coloured and the cotton was dyed a bright orange.

EXAMPLE 23

The title dye of Example 10 (0.05 g) and the title dye of Example 4 (0.05 g) were dissolved in a dyebath containing pH 7 buffer solution (30 ml) and a 5 g piece of cotton. The bath was heated to 90° C. at 1 degC.min$^{-1}$, left for 15 minutes, then Na$_2$SO$_4$ (0.75 g) was added. After a further 1.5 hours at 95° C., tris(2-aminoethyl)amine (0.022 g) was added and heating was continued at 90° C. for 1 hour. The resultant dyebath was essentially colourless and the cotton was dyed a dull mid-red with excellent wet fastness.

EXAMPLE 24

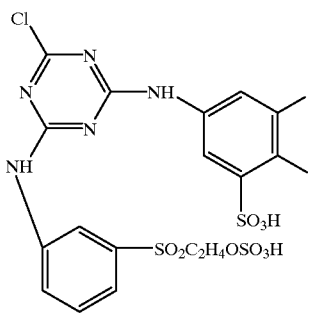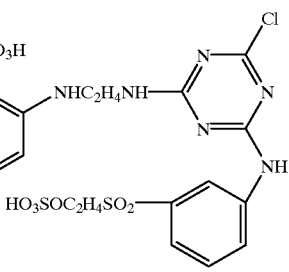

A solution of cyanuric chloride (0.06M, 11.1 g) in acetone (100 ml) was added over 5 min to a solution of 3-(β-sulphatoethylsulphonyl)aniline (0.06M, 16.9 g) in water (100 ml) at pH 6 and 0–5° C. After stirring for 1 hour, the solution was added to a solution of the triphenodioxazine dyebase described in U.S. Pat. No. 3,996,221, Column 11, lines 17–19 (66.4 g, 19% strength) in water (400 ml) and N-methyl pyrrolidone (400 ml) at pH 10. The mixture was stirred for 4 hours at pH 9. Isopropanol (21) was added and the precipitated product was filtered off, washed with isopropanol and air-dried to give the title product (24.5 g) $\mu$max 636 nm.

When the title product was applied to cotton by exhaust dyeing with tris(2-aminoethyl)amine the dyebath was left only weakly coloured.

EXAMPLE 25

The method of Example 24 was repeated except that in place of 3-(β-sulphatoethylsulphonyl)aniline there was used 4-(β-sulphatoethylsulphonyl)aniline.

EXAMPLE 26

The method of Example 5 was repeated except that in place of 3-methyl aniline there was used 3-acetamido aniline. The resultant dye gave an immobilisation of 99.5% in the immobilisation test.

EXAMPLE 27

Stage (a)—Preparation

The method of Example 5 was repeated except that in place of 3-methyl aniline there was used 3-acetamido aniline. The resultant product had a λmax at 421 nm.

Stage (b)—Dyeing

The resultant dye (0.1 g) was dissolved in water (50 ml). Cotton (5 g) was added followed by NaCl (1.25 g). The mixture was heated at 95° C. for 1 hour then cooled to 60° C. $Na_2CO_3$ (1 g) was added and heating at 60° C. was continued for 1 hour. The cotton was dyed a bright reddish-yellow shade and had good fastness properties, together with an outstanding level of fixation.

EXAMPLES 28–37

The method of Example 5 was repeated except that 3-methyl aniline was replaced by the amines listed in Table 1 below. The λmax (nm) measured is also given

TABLE 1

| Example | Amine | λ max |
|---|---|---|
| 28 | 2,4-diamino benzene sulphonic acid | 442 nm |
| 29 | N-(β-aminoethyl)-2-hydroxy-3-carbonamido-4-methyl pyridone | 456 nm |
| 30 | 1-(2-methyl-3-amino-5-sulphophenyl)-3-carboxy-pyrazol-5-one. | 466 nm |
| 31 | 1-(4-aminophenyl)-3-methyl-pyrazol-5-one | 436 nm |
| 32 | p-amino acetoacetanilide | 416 nm |
| 33 | N-methyl aniline | 388 nm |
| 34 | 3-amino benzyl alcohol | 407 nm |
| 35 | 1-amino-7-sulphonaphthalene | 484 nm |
| 36 | 3-methoxy aniline | 419 nm |
| 37 | 2,5-dimethyl aniline | 461 nm |

EXAMPLE 38

The method of Example 5 was repreated except that in place of 4(β-sulphatoethylsulphonyl)aniline there was used 4-amino-N-(β-sulphatoethyl)phenyl sulphonamide. The resultant product had a αmax at 420 nm.

EXAMPLE 39

Stage (a)

2-aminonaphthalene-1-sulphonic acid (0.08 mol) was added in portions to chlorosulphonic acid (50.0 ml) with stirring such that the temperature remained <35° C. The mixture was stirred at 35° C. for 20 hours. After this time the cooled reaction mixture was added dropwise to ice/water (200 ml) such that the temperature remained <10° C. The resulting precipitate was collected and washed with cold water. The resulting paste (0.08 mol) was added slowly with cooling to a solution of ethylene diamine (0.04 mol) in water (250 ml) such that the temperature remained in the range of 0–5° C. The pH of the resulting mixture was raised to pH 10 by the addition of 2N sodium hydroxide solution. The mixture was maintained at this pH while stirring at 0–5° C. for 2 hours. After this time the mixture was acidified to pH1 and the resulting precipitate collected and washed with acetone to yield a solid product.

Stage (b)

A solution of cyanuric chloride (0.1 mol) in acetone (100 ml) was added dropwise to a stirred solution of p-aminobenzene sulphatoethyl sulphone (0.1 mol) in water (300 ml) containing calsolene oil at pH 5 and 0–5° C. The mixture was stirred at 0–5° C. for 1 hour. After this time a solution of J-acid (0.1 mol) in water (300 ml) at pH 6 was added and the pH adjusted to pH 6.5. The mixture was stirred and allowed to warm to room temperature over 17 hours while maintaining the pH at 6.5. After this time isopropanol (1000 ml) was added and the resulting oil separated and triturated with methylated spirits yielding a solid product.

Stage (c)

The product of stage (a) (0.002 mol) was dissolved in water (20.0 ml) at pH 7. The solution was cooled to 0–5° C. and treated with 2N sodium nitrite solution (0.0044 mol) followed by concentrated hydrochloric acid (2.2 ml) and the mixture stirred at this temperature for 30 minutes. After this time excess nitrite was destroyed by the addition of sulphamic acid (2.2 ml). A solution of the product of stage (b) (0.004 mol) in water (50.0 ml) was added and the pH was raised slowly to 6.5 by the addition of 2N sodium carbonate solution. The pH was maintained at 6.5 and temperature of 0–5° C. for 1 hour and then allowed to warm to room temperature over 17 hours. The resulting precipitate was collected and dried in vacuo yielding the dye:

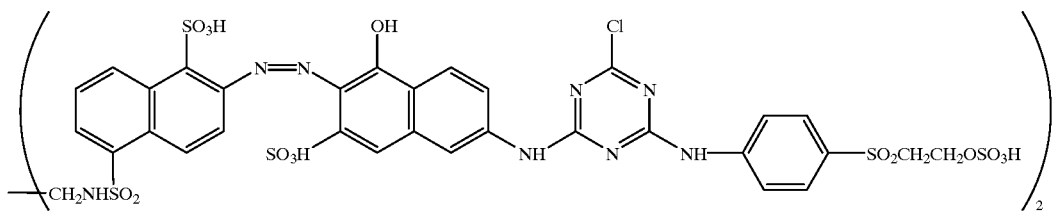

EXAMPLE 40

Stage (a)

2-aminonaphthalene-1-sulphonic acid (0.04 mol) was added in portions to chlorosulphonic acid (25.0 ml) with stirring such that the temperature <35° C. The mixture was stirred at 35° C. for 20 hours. After this time the cooled reaction mixture was added dropwise to ice/water (200 ml) such that the temperature <10° C. The resulting precipitate was collected and washed with cold water. The resulting paste (0.04 mol) was dissolved in acetone/water (170/30) (200 ml). To this solution was added p-phenylene diamine (0.02 mol) and sodium acetate (13.1 g) and the resulting mixture stirred at room temperature for 17 hours. After this time the resulting precipitate was collected and purified by recrystallisation twice from water yielding a solid product.

Stage (b)

p-aminobenzene sulphato ethylsulphone (0.06 mol) in water (100 ml) containing calsolene oil (3 drops) at pH5 was treated with a solution of cyanuric chloride (0.066 mol) in acetone (100 ml) dropwise such that the temperature was 0–5° C. The pH was maintained at pH 5 by addition of 2N Na$_2$CO$_3$ solution. The mixture was stirred at 0–5° C. for 1 hour. 1-hydroxy-8-aminonaphthalene-3-sulphonic acid (0.06 mol) in water (50.0 ml at pH 7 was added and the mixture stirred at room temperature overnight. The pH of the mixture was allowed to fall to pH2. After this time the pH of the mixture was adjusted to pH7 and stirred for a further 1 hour. Methylated spirits (400 ml) was added and the resulting precipitate collected, washed with methylated spirits and dried in vacuo yielding a solid product.

Stage (c)

A solution of the product of stage (a) (0.002 mol) was dissolved in water (20.0 ml) at pH7. A solution of 2N sodium nitrite (2.2 ml) was added and the mixture cooled to 0–5° C. The solution was treated with concentrated hydrochloric acid (2.2 ml) and the mixture stirred at 0–5° C. for 2 hours. After this time the excess nitrite was destroyed by the addition of sulphamic acid (2.0 ml). A solution of the product of stage (b) (0.004 mol) in water (50.0 ml) was added and the pH was raised slowly to 6.5 by the addition of 2N sodium carbonate solution. The mixture was maintained at pH 6.5 and stirred at 0–5° C. for 2 hours and then allowed to warm to room temperature over 17 hours. After this time methylated spirits was added and the resulting precipitate collected and dried in vacuo yielding the dye:

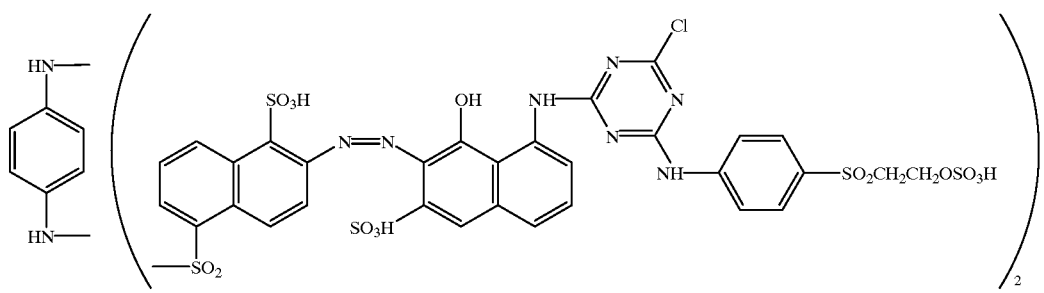

EXAMPLES 41 TO 62

The dyeing of cotton with differing dyes and nucleophilic agents was investigated using the following method.

Dye (0.1 g) was dissolved in water (50 ml) and pH adjusted to pH 5.5. Cotton (5 g) was added followed by sodium sulphate (1.25 g) and the mixture heated at 95° C. for 1 hour. Sodium hydrogen carbonate (0.25 g) was then added before heating at 95° C. for a further 30 minutes. The nucelophilic agent (sufficient such that the ratio of nucleophilic groups in the nucelophilic agent to electrophilic groups in the dye was 1.5:1) was then added and the mixture heated at 95° C. for 1 hour.

The cloth was removed from the dyebath and excess liquor wrung from it. The cloth was rinsed with aqueous acetic acid (1 gl$^{-1}$) (45 ml), boiled with water twice (50 ml for 15 minutes each) and finally rinsed with cold water (50 ml). The dyebath and the wash liquors were combined and a spectrophotometric assessment of all unfixed colour made.

% Fixation was calculated from the formula:

$$\% \text{ Fixation} = \frac{[\text{Concentration of dye in dyebath before}] - [\text{Concentration of dye in dyebath after}]}{[\text{Concentration of dye in dyebath before}]} \times 100$$

Dyes employed were those of Examples 25, 27 and 39. The nucelophilic agents were selected from those in Table 2 below.

TABLE 2

| Nuchleophilic agent | Number |
|---|---|
| Ethylene diamine | 1 |
| Hexamethylene diamine | 2 |
| Piperazine | 3 |
| 2,5-dimethyl piperazine | 4 |
| 2-amino-4-(2-amino ethylamino)aniline | 5 |
| 1,2,4-triamino benzene | 6 |
| Diethylene triamine | 7 |
| Tetra ethylene pentamine | 8 |
| Tris (2-aminoethyl)amine | 9 |

The combination of dyes and nucelophilic agents employed, and the fixation achieved (%) are given in Table 3 below.

TABLE 3

| Example No | Dye | Nucleophilic agent | % Fixation |
|---|---|---|---|
| 41 | Example 25 | 1 | 71 |
| 42 | Example 25 | 2 | 94 |
| 43 | Example 25 | 3 | 67 |
| 44 | Example 25 | 4 | 66 |
| 45 | Example 25 | 5 | 68 |
| 46 | Example 25 | 6 | 70 |
| 47 | Example 25 | 7 | 85 |
| 48 | Example 25 | 8 | 96 |
| 49 | Example 27 | 1 | 99.98 |
| 50 | Example 27 | 2 | 99.96 |
| 51 | Example 27 | 3 | 99.98 |
| 52 | Example 27 | 4 | 99.92 |
| 53 | Example 27 | 5 | 99.26 |
| 54 | Example 27 | 6 | 99.22 |
| 55 | Example 27 | 7 | 99.99 |
| 56 | Example 27 | 8 | 99.92 |
| 57 | Example 39 | 2 | 94 |
| 58 | Example 39 | 8 | 94 |
| 59 | Example 39 | 9 | 95 |
| 60 | Example 40 | 2 | 89 |

TABLE 3-continued

| Example No | Dye | Nucleophilic agent | % Fixation |
|---|---|---|---|
| 61 | Example 40 | 8 | 89 |
| 62 | Example 40 | 9 | 90 |

EXAMPLE 63–74

Cotton may be dyed employing the following, the general method given in Example 5, stage (c), with the dye and nucelophilic agent being varied as detailed in Table 4. In Table 4 PEI=polyethylene imine; JEFFAMINE is a Trademark for a range of commercially available amines.

TABLE 4

| Example No | Dye | Nucelophilic Agent |
|---|---|---|
| 63 | ex-Example 5 | PEI 600 |
| 64 | ex-Example 5 | PEI 1800 |
| 65 | ex-Example 6 | PEI 60,000 |
| 66 | ex-Example 7 | JEFFAMINE D2000 |
| 67 | ex-Example 27 | PEI 600 |
| 68 | ex-Example 27 | PEI 1800 |
| 69 | ex-Example 27 | PEI 60,000 |
| 70 | ex-Example 27 | JEFFAMINE D2000 |
| 71 | ex-Example 30 | PEI 100,000 |
| 72 | ex-Example 31 | JEFFAMINE ED900 |
| 73 | ex-Example 32 | JEFFAMINE T5000 |
| 74 | ex-Example 33 | PEI 1000 |

EXAMPLES 75–85

Cotton may be dyed by the following general method.

A composition is prepared comprising the dye (0.1 g), water (50 ml) and 0.0072 g of nucleophilic agent. Cotton (5 g) is added and the temperature raised to 50° C. Salt (1 g) and sodium bicarbonate are added and the temperature raised to 58° C. and held at this temperature for 1 hour thereby causing the dye and nucleophilic agent to join together. The cotton is removed, rinsed in water then boiled in detergent to give dyed cotton.

Details of the dyes and nucleophilic agents which may be employed are given in Table 5 below.

TABLE 5
| Example No | Dye | Nucelophilic agent |
|---|---|---|
| 75 | ex Example 5 | Trithiotriazine |
| 76 | ex Example 6 | 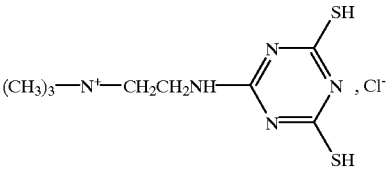 |
| 77 | ex Example 7 | 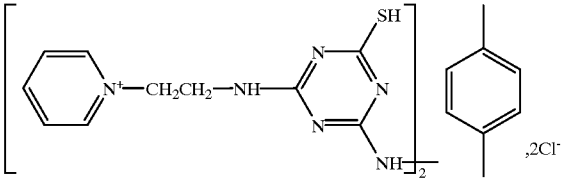 |
| 78 | ex Example 27 | 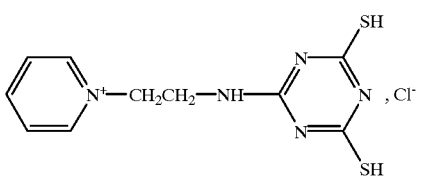 |
| 79 | ex Example 28 |  |
| 80 | ex Example 29 | 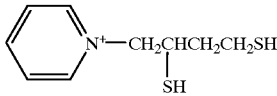 |
| 81 | ex Example 30 | 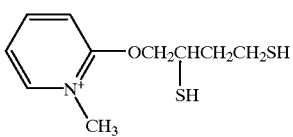 |
| 82 | ex Example 31 | 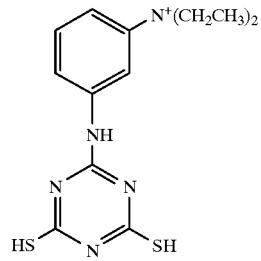 |

TABLE 5-continued

| Example No | Dye | Nucelophilic agent |
|---|---|---|
| 83 | ex Example 32 | [structure: $[(CH_3)_3N^+$-phenyl-NH-triazine(HS)(N)-NH-phenyl-NH]_2 C=O] |
| 84 | ex Example 27 | $(CH_3)_3N^+(CH_2)_5$—NH—triazine(SH)(SH) |
| 85 | ex Example 27 | Trithiotriazine |

We claim:

1. A process for the coloration of a substrate comprising applying thereto a water-soluble dye having at least two electrophilic groups and a nucleophilic agent having a molecular weight below 600 and at least one group selected from thiols, thiones, aliphatic primary amino groups and aliphatic secondary amino groups, said dye being a dye of Formula (1) or a salt thereof:

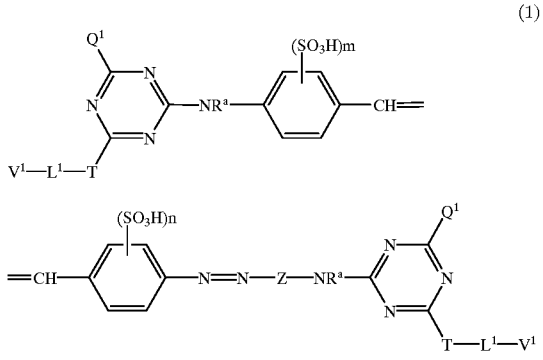

(1)

wherein:
  each $Q^1$ independently is an electrophilic group selected from halogen, sulpho and quaternary amonium or a non-electrophilic group of formula —$NR^7R^8$ and —$OR^7$ wherein $R^8$ is H or alkyl and $R^7$ is H, optionally substituted alkyl or optionally substituted aryl;
  each T independently is —O—, —S— or —$NR^a$;
  each $L^1$ independently is a divalent organic linker group;
  each $V^1$ independently is an electrophilic vinyl sulphone group, a group which is convertible to an electrophilic vinyl sulphone group on treatment with aqueous alkali or an electrophilic group of formula —$SO_2NHCH_2CH_2$—Y wherein Y is —$OSO_3H$, —$SSO_3H$, —Cl or —$OCOCH_3$;
  each $R^a$ independently is H or optionally substituted alkyl;
  Z is an optionally substituted buta-1,3-dione phenylene, naphthylene or heterocyclic group; and
  m and n are each independently 0 or 1; and wherein the electrophilic groups in the water-soluble dye react with the thiol, thione, aliphatic primary amino group or aliphatic secondary amino group in nucleophilic agent.

2. A process according to claim 1 wherein the nucleophilic agent having a molecular weight below 600 has at least two groups selected from aliphatic primary amino groups and aliphatic secondary amino groups.

3. A process according to claim 1 or 2 for the coloration of a substrate comprising the steps:
  (a) applying an aqueous solution of the dye to the substrate;
  (b) bringing the nucleophilic agent into contact with the substrate.

4. A process according to claim 1 wherein the electrophilic groups in the water-soluble dye react with the aliphatic primary amino group(s) or aliphatic secondary amino group(s) in the nucleophilic agent.

5. A process according to claim 1 wherein the water-soluble dye is a reactive dye and the process for coloration is performed under conditions such that the dye does not react to a significant extent with the substrate before it reacts with the nucleophilic agent.

6. A composition comprising:
  (i) a water-soluble dye having at least two electrophilic groups; and
  (ii) a nucleophilic agent having a molecular weight below 600 and at least one group selected from thiols, thiones, aliphatic primary amino groups and aliphatic secondary amino groups where said amino groups are optionally masked using a protecting group, said dye being a dye of Formula (1) or a salt thereof:

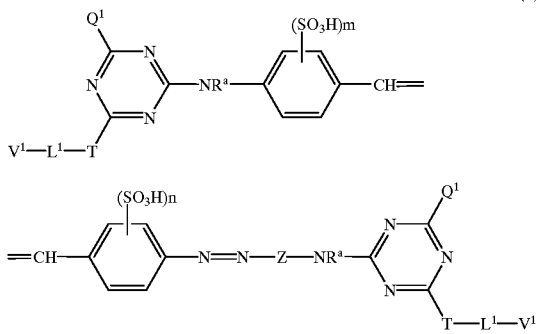

(1)

wherein:
- each $Q^1$ independently is an electrophilic group selected from halogen, sulpho and quaternary amonium or a non-electrophilic group of formula —$NR^7R^8$ and —$OR^7$ wherein $R^8$ is H or alkyl and $R^7$ is H, optionally substituted alkyl or optionally substituted aryl;
- each T independently is —O—, —S— or —$NR^a$;
- each $L^1$ independently is a divalent organic linker group;
- each $V^1$ independently is an electrophilic vinyl sulphone group, a group which is convertible to an electrophilic vinyl sulphone group on treatment with aqueous alkali or an electrophilic group of formula —$SO_2NHCH_2CH_2$—Y wherein Y is —$OSO_3H$, —$SSO_3H$, —Cl or —$OCOCH_3$;
- each $R^a$ independently is H or optionally substituted alkyl;
- Z is an optionally substituted buta-1,3-dione phenylene, naphthylene or heterocyclic group; and
- m and n are each independently 0 or 1.

7. A water-soluble dye of Formula (I) and salts thereof having at least two electrophilic groups:
wherein:
- each $Q^1$ independently is an electrophilic group selected from halogen, sulpho and quaternary amonium or a non-electrophilic group of formula —$NR^7R^8$ and —$OR^7$ wherein $R^8$ is H or alkyl and $R^7$ is H, optionally substituted alkyl or optionally substituted aryl;
- each T independently is —O—, —S— or —$NR^a$—;
- each $L^1$ independently is a divalent organic linker group;
- each $V^1$ independently is an electrophilic vinyl sulphone group, a group which is convertible to an electrophilic vinyl sulphone group on treatment with aqueous alkali or an electrophilic group of formula —$SO_2NHCH_2CH_2$—Y wherein Y is —$OSO_3H$, —$SSO_3H$, —Cl or —$OCOCH_3$;
- each $R^a$ independently is H or optionally substituted alkyl;
- Z is an optionally substituted buta-1,3-dione phenylene, naphthylene or heterocyclic group; and
- m and n are each independently 0 or 1.

8. A dye according to claim 7 wherein Z is an optionally substituted 1,3-phenylene or 1,4-phenylene group.

9. A dye according to claim 7 of the Formula (2) and salts thereof:

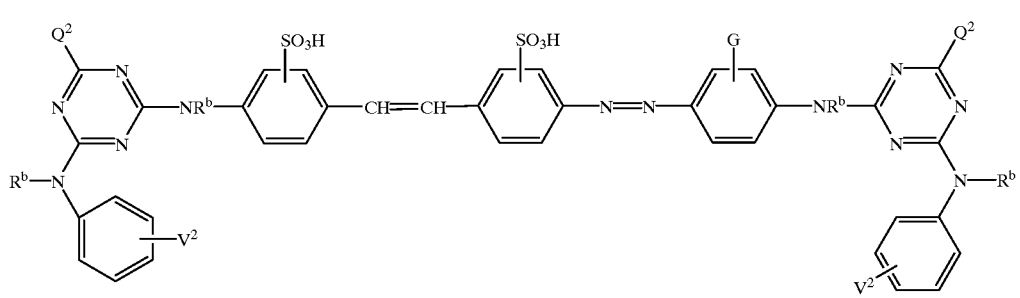

(2)

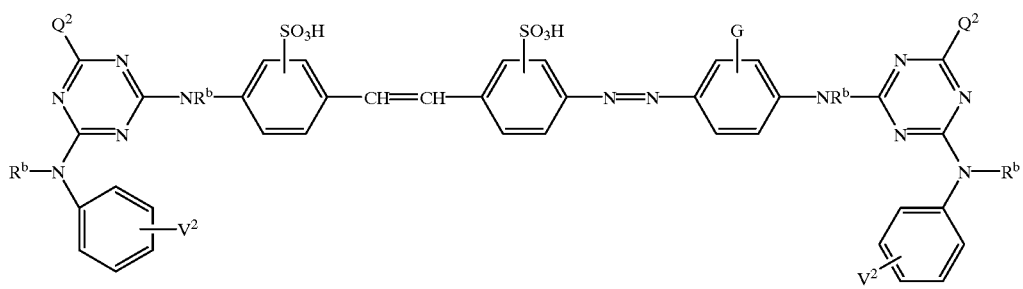

(2)

wherein:
- each $R^b$ independently is H or $C_{1-4}$-alkyl;
- G is H, alkyl, alkoxy, amido, ureido, halo, nitro, carboxy, amino or sulpho;
- each $Q^2$ independently is F, Cl, or a quaternary ammonium group; and
- each $V^2$ independently is a vinyl sulphone group or a group which is convertible to a vinyl sulphone group on treatment with aqueous alkali, or a group of formula —$SO_2NHCH_2CH_2$—Y wherein Y is —$OSO_3H$, —$SSO_3H$, —Cl or —$OCOCH_3$, or a group of formula —$NHCOCR^b$=$CH_2$ or —$NHCOCBr$=$CH_2$.

10. A dye according to claim 9, wherein G represents an acetamido group.

* * * * *